United States Patent [19]

Merrill

[11] 3,721,695

[45] March 20, 1973

[54] TRIS(DIFLUOROAMINO)-METHYL FLUOROSULFONATE

[75] Inventor: Claude I. Merrill, Lancaster, Calif.

[73] Assignee: The Dow Chemical Company, Midland, Mich.

[22] Filed: June 13, 1968

[21] Appl. No.: 736,862

[52] U.S. Cl. ........................... 260/456 A, 149/109
[51] Int. Cl. ................................. C07c 143/02
[58] Field of Search ........... 260/500.5, 501.2, 456 A

[56] References Cited

UNITED STATES PATENTS 3,375,259  3/1968  Gibson et al. .................. 149/109 X

*Primary Examiner*—Leland A. Sebastian
*Attorney*—C. Kenneth Bjork and L. S. Jowanovitz

[57] ABSTRACT

The compound tris(difluoroamino)methyl fluorosulfonate and a method for its preparation by reacting tris(difluoroamino)bromomethane with peroxydisulfuryl difluoride at an elevated temperature.

5 Claims, No Drawings

TRIS(DIFLUOROAMINO)-METHYL FLUOROSULFONATE

SUMMARY OF THE INVENTION

This invention relates to a fluorine-nitrogen-sulfur containing organic compound and in particular is concerned with the novel compound tris(difluoroamino)methyl fluorosulfonate and to a process for its preparation.

This compound is a colorless liquid at room temperature and has the formula

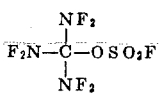

Tris(difluoroamino)methyl fluorosulfonate is suitable for use as an oxidizer in a propellant formulation for propulsion of rockets and missiles. Because of the high fluorine/carbon ratio and its molecular structure this compound possesses large quantities of potential energy making it highly desirable as an oxidizer component of high energy propellant systems. It is also suitable for use in the application requiring an oxidizer with high oxidizing potential.

In general, the compound is prepared by reacting tris(difluoroamino)bromomethane $(NF_2)_3CBr$ with peroxydisulfuryl difluoride, $S_2O_6F_2$, at an elevated temperature. The product compound is recovered by first separating volatile materials from the reaction mass and isolating the tris(difluoroamino)methyl fluorosulfonate product by chromatographic or other separatory techniques.

DESCRIPTION OF A PREFERRED EMBODIMENT

In a preferred embodiment of the present invention at least about equimolar quantities of tris(difluoroamino)bromomethane and peroxydisulfuryl difluoride are reacted in a sealed reactor under autogeneous pressure and with agitation at a temperature of at least about 50° C., usually from about 70° C. to about 100° C. or higher, preferably at from about 90° C. to about 100° C. for a period of at least about 6 hours, ordinarily from about 18 to about 72 hours or more. Ordinarily an excess of peroxydisulfuryl difluoride to provide a reaction mixture of $S_2O_6F_2$ /$(NF_2)_3CBr$ having a gram mole ratio of from about 2 to about 10, usually from 2.5 to about 5, is employed. This assures driving of the reaction toward completion and the production of the tris(difluoroamino)methyl fluorosulfonate in high yields. Any unreacted peroxydisulfuryl difluoride readily can be recovered for reuse.

The reactor is cooled, volatile materials removed by application of a reduced pressure and moderate heating and the tris(difluoroamino)methyl fluorosulfonate product recovered in a purified form by chromatographic techniques.

The following Example will serve to further illustrate the present invention but is not meant to limit it thereto.

EXAMPLE

About 704 milligrams ($\approx$0.003 gram mole) of tris(difluoroamino)bromomethane and 2.8 grams (0.015 gram mole) of peroxydisulfuryl difluoride were condensed at a temperature of about minus 196° C. into a 20 milliliter capacity glass reactor having a Swagelok fitting and valve. The reactor also contained a magnetic stirring bar. The reactor valve was closed and the sealed reactor and contents were immersed in a silicone oil bath having a temperature of about 90° C. The reaction mixture was agitated for a period of about 18 hours while maintaining the bath temperature at about 90° C. Following the reaction period, the reactor and product mixture were cooled to room temperature. Volatile materials were removed from the reactor and transferred at a low absolute pressure and 40° C. temperature through 12 foot chromatographic column of 25 per cent polyperfluorotributylamine oil absorbed on Chromosorb W diatomite aggregate.

A total of about 360 milligrams of a colorless liquid, subsequently identified as the novel compound tris(difluoroamino)methyl fluorosulfonate, was isolated and recovered along with 230 milligrams of unreacted tris(difluoroamino)bromomethane ($\approx$70 percent yield).

The assigned structure of tris(difluoroamino)methyl fluorosulfonate

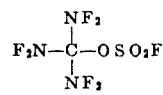

was established from the molecular weight, mass spectrum, NMR spectrum and infrared spectrum. These analyses gave:

Molecular Weight (by vapor density):
   Found 271
   Calculated theoretical molecular weight 276.

Mass Spectrum

| N/e | Abundance | Assignment |
|---|---|---|
| 215 | 2.8 | $(F_2N)_2COSO_2F$ |
| 168 | 3.9 | $(F_2N)_3C$ |
| 144 | 6.0 | $FN=COSO_2F$ |
| 97 | 4.9 | $FN=CNF_2$ |
| 83 | 100 | $SO_2F$ |
| 80 | 15 | $SO_3+$ and $F_2NCO$ |
| 78 | 3.4 | FNCNF |
| 67 | 9.2 | SOF |
| 64 | 13 | $SO_2$ |
| 61 | 47 | FNCO |
| 59 | 1.9 | FNCN |
| 52 | 25 | $NF_2$ |

NMR Spectrum ($F^{19}$ with $CFCl_3$ as reference):

| Group | Peaks, $\phi$ | Area Ratio |
|---|---|---|
| $NF_2$ | −28.2 | 6 |
| SF | −52.0 | 1 |

SF peaks split into 7 lines with J=3.2 cps.

Infrared Spectrum

| Wave lengths $\mu$ | |
|---|---|
| 6.7 | sharp peak |
| 7.95 | sharp peak |
| 8.45 | narrow band |

| | |
|---|---|
| 8.95 | band |
| 9.65 | narrow band |
| 9.95 | peak |
| 10.2–10.45 | broad band |
| 10.9–11.0 | band |
| 11.75–11.82 | band |

Boiling Point (calculated) ≈ 75° C.

The results of these analytical studies confirm the proposed structure.

This preparation was repeated using the apparatus described above and following the same general procedure employing the peroxydisulfuryl difluoride and tris(difluoroamino)bromomethane reactants at a gram mole ratio of about 2.5. For this preparation, the reaction mass was heated at about 70° C. for a period of about 72 hours.

The separated and recovered tris(difluoroamino)methyl fluorosulfonate product was shown by analysis to be identical with that described directly hereinbefore.

Various modifications can be made in the present invention without departing from the spirit or scope thereof for it is understood that I limit myself only as defined in the appended claims.

I claim:

1. The compound tris(difluoroamino)methyl fluorosulfonate.

2. A process for preparing tris(difluoroamino)methyl fluorosulfonate which comprises:
    a. reacting tris(difluoroamino)bromomethane with peroxydisulfuryl difluoride at an elevated temperature,
    b. separating tris(difluoroamino)methyl fluorosulfonate from the resulting product mass, and
    c. recovering said tris(difluoroamino)methyl fluorosulfonate.

3. The process as defined in claim 2 wherein said tris(difluoroamino)bromomethane and said peroxydisulfuryl difluoride reactants initially are present in at least equimolar quantities and the process is carried out under autogeneous pressure at a temperature of at least about 50° C. for a period of at least about 6 hours with agitation of the reaction mass.

4. The process as defined in claim 3 wherein the peroxydisulfuryl difluoride/tris(difluoroamino)bromomethane gram mole ratio is from about 2 to about 10 and the process is carried out at a temperature of from about 70° C. to about 100° C. for a period of from about 18 to about 72 hours.

5. The process as defined in claim 4 wherein the peroxydisulfuryl difluoride/tris(difluoroamino)bromomethane gram mole ratio ranges from about 2.5 to about 5.

\* \* \* \* \*